(12) United States Patent
Ueno

(10) Patent No.: US 7,990,521 B2
(45) Date of Patent: *Aug. 2, 2011

(54) DISTANCE/SPEED METER AND DISTANCE/SPEED MEASURING METHOD

(75) Inventor: Tatsuya Ueno, Tokyo (JP)

(73) Assignee: Yamatake Corporation, Tokyo (JP)

( * ) Notice: Subject to any disclaimer, the term of this patent is extended or adjusted under 35 U.S.C. 154(b) by 704 days.

This patent is subject to a terminal disclaimer.

(21) Appl. No.: 12/080,550

(22) Filed: Apr. 2, 2008

(65) Prior Publication Data

US 2010/0321668 A1    Dec. 23, 2010

(30) Foreign Application Priority Data

Apr. 3, 2007 (JP) .................................. 2007-097244
Mar. 5, 2008 (JP) .................................. 2008-054699

(51) Int. Cl.
*G01C 3/08* (2006.01)
(52) U.S. Cl. ........ 356/4.01; 356/3.01; 356/3.1; 356/4.1; 356/5.01
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

2008/0181354 A1*    7/2008    Ueno ........................... 377/24

FOREIGN PATENT DOCUMENTS

JP    2006-313080 A    11/2006

OTHER PUBLICATIONS

Ueda et al., "Distance Meter Using Self-Mixing Effect of Semiconductor Laser", Papers for 1994 Tokai-Section Joint Conference of the 8 Institutes of Electrical and Related Engineers.
Yamada et al., "Study of Compact Distance Meter by Self-Coupled Effect of Laser Diode", Bulletin of Aichi Institute of Technology, vol. 31B, pp. 35-42, 1996.
Giuliani et al., "Laser diode self-mixing Technique for sensing applications", Journal of Optics A: Pure and Applied Optics, pp. 283-294, 2002.

* cited by examiner

*Primary Examiner* — Thomas Tarcza
*Assistant Examiner* — Luke Ratcliffe
(74) *Attorney, Agent, or Firm* — Blakely, Sokoloff, Taylor & Zafman

(57) ABSTRACT

In a distance/speed meter, first and second semiconductor lasers emit parallel laser light beams to a measurement target. A first laser driver drives the first semiconductor laser such that the oscillation interval in which at least the oscillation wavelength monotonically increases repeatedly exists. A second laser driver drives the second semiconductor laser such that the oscillation wavelength increases/decreases inversely to the oscillation wavelength of the first semiconductor laser. First and second light-receiving devices convert optical outputs from the first and second semiconductor lasers into electrical signals. A counting unit counts the numbers of interference waveforms generated by the first and second laser light beams and return light beams of the first and second laser light beams. A computing device computes the distance to the measurement target and the speed of the measurement target from the minimum and maximum oscillation wavelengths of the first and second semiconductor lasers and the counting result obtained by the counting unit.

19 Claims, 10 Drawing Sheets

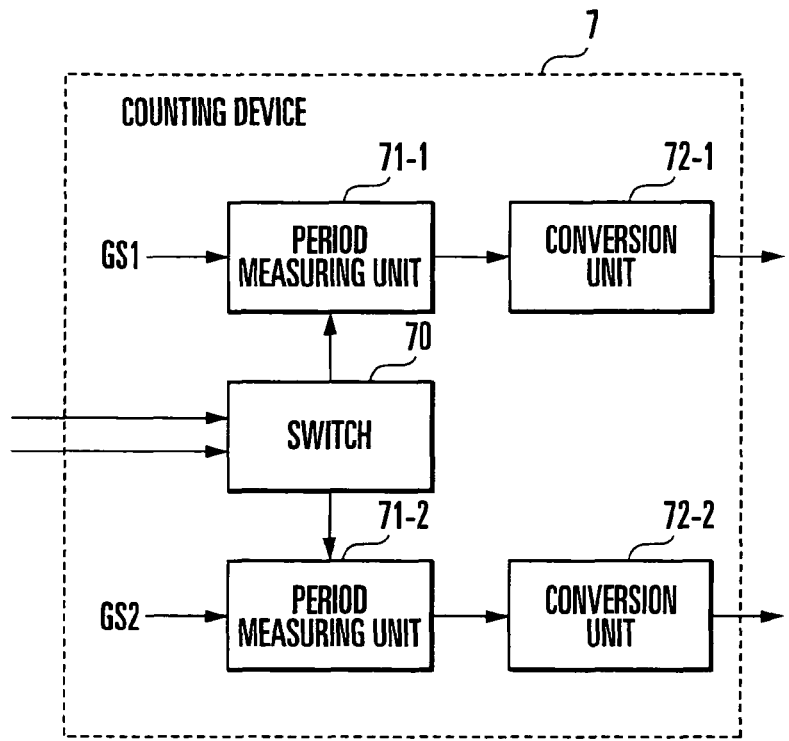
F I G. 4
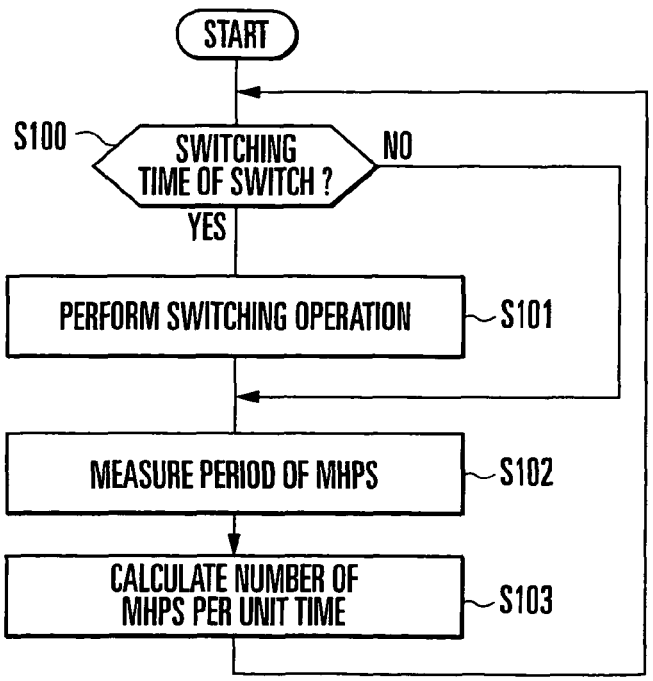
F I G. 5

DISTANCE/SPEED METER AND DISTANCE/SPEED MEASURING METHOD

BACKGROUND OF THE INVENTION

The present invention relates to a distance/speed meter and distance/speed measuring method which measure at least the distance to a measurement target or the speed of the measurement target by using optical interference.

Distance measurement by a laser using optical interference does not disturb a measurement target because of noncontact measurement, and has been used for a long time as a high-accuracy measuring method. Recently, attempts have been made to use a semiconductor laser as a light measurement light source to achieve a reduction in apparatus size. A typical example of such an apparatus is an apparatus using an FM heterodyne interferometer. This apparatus can measure a relatively long distance with high accuracy, but has a drawback of a complicated optical system because of the use of an interferometer outside a semiconductor laser.

In contrast to this, measuring instruments have been proposed, which use the interference between output light from a semiconductor laser and return light from a measurement target inside the laser (self-mixing effect) in, for example, reference 1 (Japanese Patent Laid-Open No. 2006-313080), reference 2 (Tadashi Ueda, Jun Yamada, and Susumu shitoh, "Distance Meter Using Self-Mixing Effect of Semiconductor Laser", Papers for 1994 Tokai-Section Joint Conference of the 8 Institutes of Electrical and Related Engineers), reference 3 (Jun Yamada, Susumu shitoh, Norio Tuda, and Tadashi Ueda, "Study of Compact Distance Meter by Self-Coupled Effect of Laser Diode", Bulletin of Aichi Institute of Technology, Vol. 31B, pp. 35-42, 1996), and reference 4 (Guido Giuliani, Michele Norgia, Silvano Donati and Thierry Bosch, "Laser diode self-mixing technique for sensing applications", JOURNAL OF OPTICS A: PURE AND APPLIED OPTICS, pp. 283-294, 2002).

In such a self-mixing type laser measuring instrument, a photodiode built-in semiconductor laser has light-emitting, interference, and light-receiving functions at the same time, and hence allows great simplification of an external interference optical system. A sensor unit therefore comprises only a semiconductor laser and a lens, and becomes smaller than conventional sensor units. This instrument also has a characteristic feature that its distance measurement range is wider than that of triangulation.

FIG. 13 shows a complex cavity model of an FP type (Fabry-Perot type) semiconductor laser. Part of reflected light from a measurement target 104 tends to return into an oscillation area. Slight return light mixes with laser light inside a semiconductor laser cavity 101, resulting in unstable operation and noise (complex cavity noise or return light noise). Even a very small amount of return light relative to output light causes a noticeable change in the characteristics of the semiconductor laser. Such a phenomenon is not limited to a Fabry-Perot type (to be referred to as an FP type) semiconductor laser, and also occurs in other types of semiconductor lasers such as a vertical cavity surface emitting laser (to be referred to as a VCSEL type hereinafter) and a distributed feedback laser type (to be referred to as a DFB laser type).

Let $\lambda$ be the oscillation wavelength of the laser and L be the distance from a cleavage plane 102 near the measurement target 104 to the measurement target 104. In this case, when the following resonance condition is satisfied, return light and laser light in the cavity 101 strengthen each other. Consequently, the laser power slightly increases.

$$L=q\lambda/2 \quad (1)$$

where q is an integer. This phenomenon can be sufficiently observed even with very weak scattered light from the measurement target 104 when an amplifying action occurs as the apparent reflectance inside the semiconductor laser cavity 101 increases.

A semiconductor laser emits laser light having different frequencies in accordance with the magnitude of injection current. This laser therefore allows direct modulation of the oscillation frequency by using an injection current without requiring any external modulator when an oscillation frequency is modulated. FIG. 14 shows the relationship between the oscillation wavelength and the output waveform of a photodiode 103 when the oscillation wavelength of the semiconductor laser is changed at a predetermined rate. When $L=q\lambda/2$ indicated in equation (1) is satisfied, the phase difference between return light and laser light inside the cavity 101 becomes 0° (in phase), and the return light and the laser light inside the cavity 101 strengthen each other most. When $L=q\lambda/2+\lambda/4$, the phase difference becomes 180° (in opposite phase), and the return light and the laser light inside the cavity 101 weaken each other most. As the oscillation wavelength of the semiconductor laser is changed, therefore, the laser power increases and decreases alternately and repeatedly. When the laser power is detected at this time by the photodiode 103 provided in the cavity 101, a stepwise waveform having a constant period like that shown in FIG. 14 is obtained. Such a waveform is generally called an interference fringe.

Each of the elements of this stepwise waveform, i.e., the interference fringe, is called a mode hop pulse (to be referred to as an MHP hereinafter). MHP is a phenomenon different from a mode hopping phenomenon. Assume that the distance to the measurement target 104 is represented by L1, and the number of MHPs is 10. In this case, as the distance decreases to L2 which is ½ of L1, the number of MHPs becomes five. That is, as the oscillation wavelength of the semiconductor laser changes in a predetermined time, the number of MHPs changes in proportion to the measurement distance. Therefore, detecting MHPs by the photodiode 103 and measuring the frequency of MHPs can easily measure the distance.

A self-mixing type laser measuring instrument allows great simplification of an external interference optical system outside a cavity, and hence can achieve downsizing. In addition, this instrument requires no high-speed circuit and is robust against disturbance light. In addition, the instrument can operate even with very weak return light from a measurement target, and hence is not influenced by the reflectance of the measurement target. That is, the instrument can be used for any types of measurement targets. However, conventional interference type distance meters including self-mixing type distance meters cannot measure distances to moving measurement targets, even though they can measure distances to stationary measurement targets.

The present inventor has therefore proposed a distance/speed meter which can measure the speed of a measurement target as well as the distance to a stationary measurement target (see reference 1). FIG. 15 shows the arrangement of this distance/speed meter. The distance/speed meter in FIG. 15 includes a semiconductor laser 201 which applies a laser beam to a measurement target, a photodiode 202 which converts an optical output from the semiconductor laser 201 into an electrical signal, a lens 203 which focuses light from the semiconductor laser 201 to apply it to a measurement target 210 and also focuses return light from the measurement target 210 to make it strike the semiconductor laser 201, a laser driver 204 which causes the semiconductor laser 201 to alternately repeat the first oscillation interval in which the oscillation wavelength of the semiconductor laser 201 continuously increases and the second oscillation interval in which the oscillation wavelength continuously decreases, a current/voltage conversion amplifier 205 which converts an output current from the photodiode 202 into a voltage and amplifies it, a signal extraction circuit 206 which calculates the second-order differential of an output voltage from the current/voltage conversion amplifier 205, a counting circuit 207 which counts the number of MHPs contained in an output voltage from the signal extraction circuit 206, a computing device 208 which calculates the distance to the measurement target 210 and the speed of the measurement target 210, and a display device 209 which displays the calculation result obtained by the computing device 208.

The laser driver 204 supplies a triangular wave driving current, which repeatedly increases and decreases at a constant change rate with respect to time, as an injection current and supplies it to the semiconductor laser 201. With this operation, the semiconductor laser 201 is driven to alternately repeat the first oscillation interval in which the oscillation wavelength continuously increases at a constant change rate and the second oscillation interval in which the oscillation wavelength continuously decreases at a constant change rate. FIG. 16 shows a temporal change in the oscillation wavelength of the semiconductor laser 201. Referring to FIG. 16, reference symbol P1 denotes the first oscillation interval; P2, the second oscillation interval; λa, the minimum value of the oscillation wavelength in each interval; λb, the maximum value of the oscillation wavelength in each interval; and T, the period of a rectangular wave.

The laser light emitted from the semiconductor laser 201 is focused by the lens 203 and strikes the measurement target 210. The light reflected by the measurement target 210 is focused by the lens 203 and strikes the semiconductor laser 201. The photodiode 202 converts an optical output from the semiconductor laser 201 into a current. The current/voltage conversion amplifier 205 converts an output current from the photodiode 202 into a voltage. The signal extraction circuit 206 calculates the second-order differential of the output voltage from the current/voltage conversion amplifier 205. The counting circuit 207 counts the number of MHPs contained in the output voltage from the signal extraction circuit 206 in each of first and second oscillation intervals P1 and P2. The computing device 208 calculates the distance to the measurement target 210 and the speed of the measurement target 210 on the basis of the minimum oscillation wavelength λa and maximum oscillation wavelength λb of the semiconductor laser 201, the number of MHPs in the first oscillation interval P1, and the number of MHPs in the second oscillation interval P2.

The distance/speed meter disclosed in reference 1 can simultaneously measure the distance to a measurement target and the speed of the measurement target. In order to measure a distance and a speed, this distance/speed meter, however, needs to count the number of MHPs at least three times in, for example, a first oscillation interval t−1, second oscillation interval t, and first oscillation interval t+1. This meter requires a long period of time for measurement.

SUMMARY OF THE INVENTION

The present invention has been made to solve the above problem, and has as its object to shorten the measurement time in a distance/speed meter and distance/speed measuring method which can measure the speed of a measurement target as well as the distance to a stationary measurement target by using optical interference.

In order to achieve the above object, according to the present invention, there is provided a distance/speed meter comprising a first semiconductor laser which emits first laser light to a measurement target, a second semiconductor laser which emits second laser light to the measurement target parallelly to the first laser light, a first laser driver which drives the first semiconductor laser such that an oscillation interval in which at least an oscillation wavelength monotonically increases repeatedly exists, a second laser driver which drives the second semiconductor laser such that an oscillation wavelength increases/decreases inversely to the oscillation wavelength of the first semiconductor laser, a first light-receiving device which converts at least an optical output from the first semiconductor laser into an electrical signal, a second light-receiving device which converts at least an optical output from the second semiconductor laser into an electrical signal, counting means for counting the number of interference waveforms generated by the first laser light and return light of the laser light from the measurement target and contained in an output signal from the first light-receiving device, and the number of interference waveforms generated by the second laser light and return light of the laser light from the measurement target and contained in an output signal from the second light-receiving device, and computing means for calculating at least one of a distance to the measurement target and a speed of the measurement target from a minimum oscillation wavelength and a maximum oscillation wavelength of the first semiconductor laser and the second semiconductor laser and a counting result obtained by the counting means.

In addition, according to the present invention, there is provided a distance/speed measuring method comprising the steps of driving a first semiconductor laser which emits first laser light to a measurement target such that an oscillation interval in which at least an oscillation wavelength continuously monotonically increases repeatedly exists, driving a second semiconductor laser which emits second laser light to the measurement target parallelly to the first laser light, counting the number of interference waveforms generated by the first laser light and return light of the laser light from the measurement target and contained in an output signal from a first light-receiving device, and the number of interference waveforms generated by the second laser light and return light of the laser light from the measurement target and contained in an output signal from a second light-receiving device, and calculating at least one of a distance to the measurement target and a speed of the measurement target from a minimum oscillation wavelength and a maximum oscillation wavelength of the first semiconductor laser and the second semiconductor laser and the numbers of interference waveforms of the first laser light and the second laser light.

BRIEF DESCRIPTION OF THE DRAWINGS

FIG. 4 is a block diagram showing an example of the arrangement of a counting device in the first embodiment of the present invention;

FIG. 5 is a flowchart showing the operation of the counting device in FIG. 4;

DESCRIPTION OF THE PREFERRED EMBODIMENTS

The present invention is a technique of measuring a distance on the basis of the interference signal of a wave emitted at the time of sensing using wavelength modulation and a wave reflected by a target. This technique can therefore be applied to optical interferometers other than self-mixing type interferometers and to interferometers other than optical interferometers. A case in which the self-mixing of a semiconductor laser is used will be described in more detail. When the oscillation wavelength of the semiconductor laser is changed while laser light is applied from the laser to a measurement target, the displacement of the measurement target is reflected in the number of MHPs while the oscillation wavelength changes from the minimum oscillation wavelength to the maximum oscillation wavelength (or changes from the maximum oscillation wavelength to the minimum oscillation wavelength). Therefore, checking the number of MHPs as the oscillation wavelength is changed makes it possible to detect the state of a measurement target. The above description has been made about the basic principle of the interferometer.

First Embodiment

Figure 1:
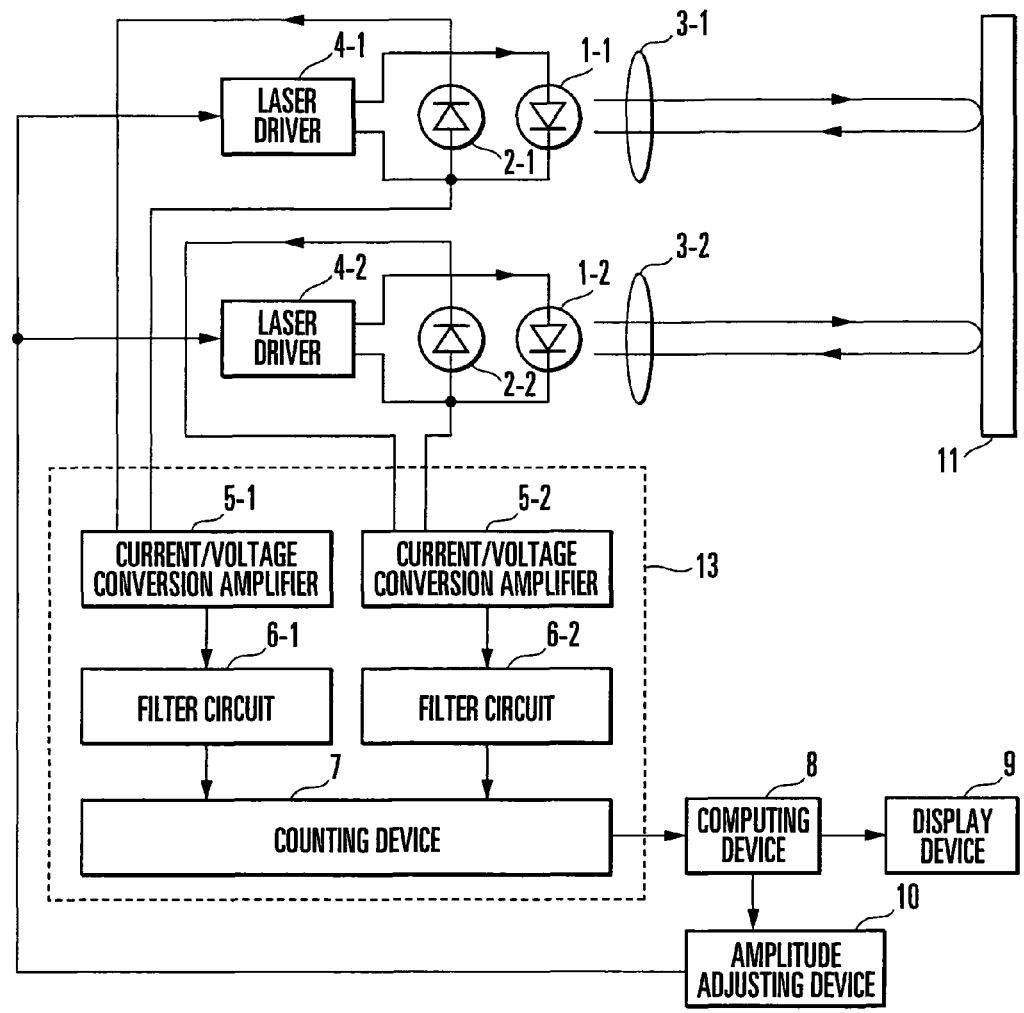
FIG. 1 is a block diagram showing the arrangement of a distance/speed meter according to the first embodiment of the present invention.

The first embodiment of the present invention will be described below with reference to the accompanying drawings. FIG. 1 shows the arrangement of a distance/speed meter according to the first embodiment of the present invention. The distance meter in FIG. 1 includes first and second semiconductor lasers 1-1 and 1-2 which emit laser light beams to a measurement target 11, photodiodes 2-1 and 2-2 serving as first and second light-receiving devices which respectively convert optical outputs from the semiconductor lasers 1-1 and 1-2 into electrical signals, lenses 3-1 and 3-2 which focus light beams from the semiconductor lasers 1-1 and 1-2 to apply them to the measurement target 11 and also focus return light beams from the measurement target 11 to make them strike the semiconductor lasers 1-1 and 1-2, first and second laser drivers 4-1 and 4-2 which cause the semiconductor lasers 1-1 and 1-2 to alternately repeat the first oscillation interval in which the oscillation wavelengths of the semiconductor lasers 1-1 and 1-2 continuously increase and the second oscillation interval in which the oscillation wavelengths continuously decrease, current/voltage conversion amplifiers 5-1 and 5-2 which convert output currents from the photodiodes 2-1 and 2-2 into voltages and amplifies them, filter circuits 6-1 and 6-2 which remove carrier waves from output voltages from the current/voltage conversion amplifiers 5-1 and 5-2, a counting device 7 which counts the numbers of MHPs contained in output voltages from the filter circuits 6-1 and 6-2, a computing device 8 which calculates the distance to the measurement target 11 and the speed of the measurement target 11, a display device 9 which displays the calculation result obtained by the computing device 8, and an amplitude adjusting device 10 which controls the laser drivers 4-1 and 4-2 to properly adjust the amplitudes of driving currents for the semiconductor lasers 1-1 and 1-2. The current/voltage conversion amplifiers 5-1 and 5-2, filter circuits 6-1 and 6-2, and counting device 7 constitute a counting unit 13.

For easy description, assume that as the semiconductor lasers 1-1 and 1-2, lasers of a type (VCSEL type or DFB laser type) that have no mode hopping phenomenon are used.

The laser drivers 4-1 and 4-2 supply triangular wave driving currents, which repeatedly increase and decrease at constant change rates with respect to time, as injection currents and supply them to the semiconductor lasers 1-1 and 1-2. With this operation, each of the semiconductor lasers 1-1 and 1-2 is driven to alternately repeat the first oscillation interval in which the oscillation wavelength continuously increases at a constant change rate in proportion to the magnitude of an injection current and the second oscillation interval in which the oscillation wavelength continuously decreases at a constant change rate. At this time, the laser drivers 4-1 and 4-2 supply driving currents to the semiconductor lasers 1-1 and 1-2 so as to change their oscillation wavelengths in a reverse manner. That is, the change rates of the oscillation wavelengths of the semiconductor lasers 1-1 and 1-2 are equal in absolute value and opposite in polarity. Therefore, when the oscillation wavelength of the semiconductor laser 1-1 becomes the maximum value, the oscillation wavelength of the semiconductor laser 1-2 becomes the minimum value, and vice versa.

Figure 2:
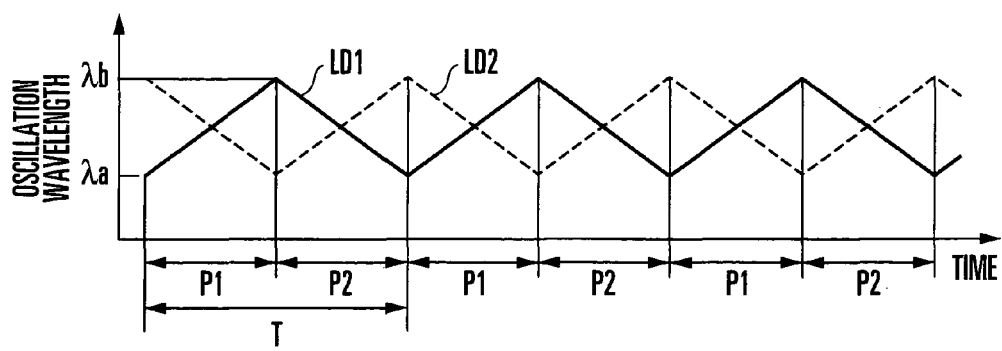
FIG. 2 is a timing chart showing an example of a temporal change in the oscillation wavelength of a semiconductor laser according to the first embodiment of the present invention.

FIG. 2 shows temporal changes in the oscillation wavelengths of the semiconductor lasers 1-1 and 1-2. Referring to FIG. 2, reference symbol LD1 denotes the oscillation wavelength of the semiconductor laser 1-1; LD2, the oscillation wavelength of the semiconductor laser 1-2; P1, the first oscillation interval; P2, the second oscillation interval; λa, the minimum value of the oscillation wavelength in each interval; λb, the maximum value of the oscillation wavelength in each interval; and T, the period of a rectangular wave. In this embodiment, the maximum value λb and minimum value λa of the oscillation wavelength are kept constant, and a difference λb−λa between them is also kept constant.

The laser light beams emitted from the semiconductor lasers 1-1 and 1-2 are focused by the lenses 3-1 and 3-2 and strike the measurement target 11. At this time, the laser light beams emitted from the semiconductor lasers 1-1 and 1-2 are parallel to each other and strike the measurement target 11. The light beams reflected by the measurement target 11 are focused by the lenses 3-1 and 3-2 and strike the semiconductor lasers 1-1 and 1-2. It is not, however, essential that the lenses 3-1 and 3-2 focus light. The photodiodes 2-1 and 2-2 convert optical outputs from the semiconductor lasers 1-1 and 1-2 into currents. The current/voltage conversion amplifiers 5-1 and 5-2 convert output currents from the photodiodes 2-1 and 2-2 into voltages and amplifies them.

Figure 3A:
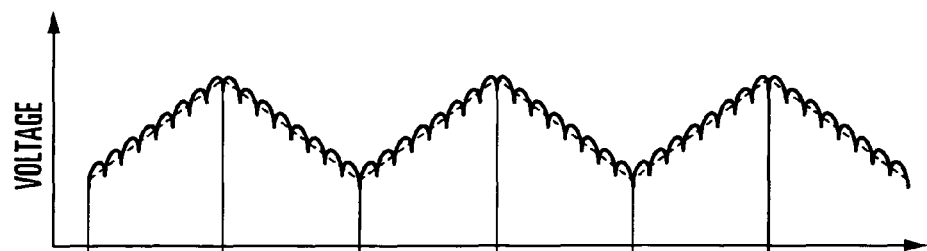
FIGS. 3A and 3B are timing charts each schematically showing the output voltage waveform of a current/voltage conversion amplifier in the first embodiment of the present invention.
Figure 3B:
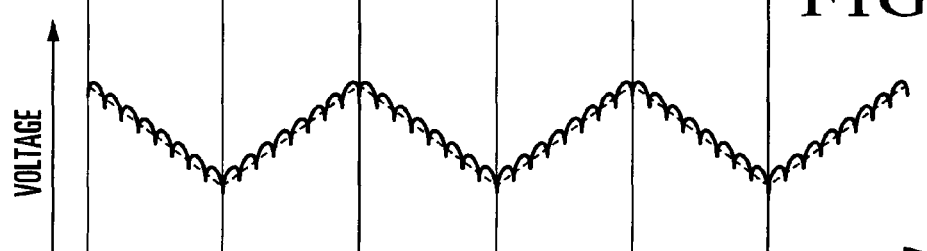
Figure 3C:
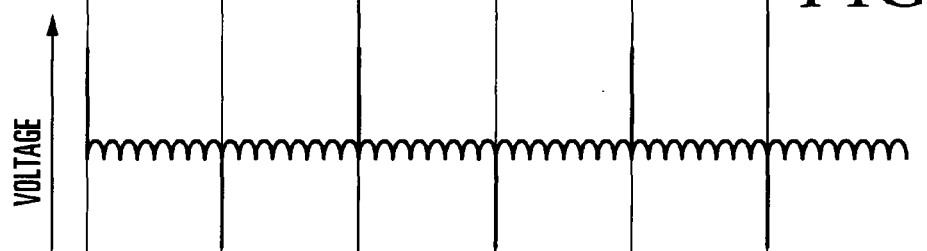
FIGS. 3C and 3D are timing charts each schematically showing the output voltage waveform of a filter circuit.
Figure 3D:
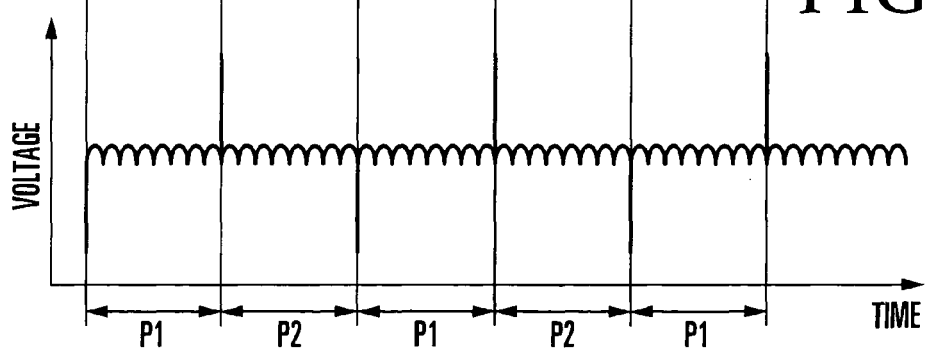

Each of the filter circuits 6-1 and 6-2 has a function of extracting a superimposed signal from a modulated wave. FIGS. 3A and 3B schematically show the output voltage waveforms of the current/voltage conversion amplifiers 5-1 and 5-2. FIGS. 3C and 3D schematically show the output voltage waveforms of the filter circuits 6-1 and 6-2. FIGS. 3A to 3D show the process of extracting the MHP waveforms (superimposed waves) in FIGS. 3C and 3D by removing the oscillation waveforms (carrier waves) of the semiconductor lasers 1-1 and 1-2 in FIG. 2 from the waveforms (modulated waves) in FIGS. 3A and 3B which correspond outputs from the photodiodes 2-1 an 2-2.

The counting device 7 sequentially counts the numbers of MHPs contained in outputs from the filter circuits 6-1 and 6-2 per unit time for each of the filter circuits 6-1 and 6-2. FIG. 4 shows an example of the arrangement of the counting device 7. FIG. 5 is a flowchart showing the operation of the counting device 7. The counting device 7 comprises a switch 70, period measuring units 71-1 and 71-2, and conversion units 72-1 and 72-2.

The switch 70 of the counting device 7 determines whether the switching timing has come (step S100 in FIG. 5). If the switching timing has come, the switch 70 switches the connection between the outputs of the filter circuits 6-1 and 6-2 and the period measuring units 71-1 and 71-2 (step S101). The switching timing of the switch 70 occurs at intervals of ½ a period T. That is, in the first oscillation interval P1, the switch 70 connects the output of the filter circuit 6-1 to the input of the period measuring unit 71-1, and connects the output of the filter circuit 6-2 to the period measuring unit 71-2. In the second oscillation interval P2, the switch 70 connects the output of the filter circuit 6-2 to the input of the period measuring unit 71-1, and connects the output of the filter circuit 6-1 to the period measuring unit 71-2 (step S101).

The period measuring unit 71-1 measures the period of a leading edge of an output from the switch 70 during the first counting interval (i.e., the period of an MHP) every time a leading edge is generated in the output from the switch 70 (step S102 in FIG. 5). Likewise, the period measuring unit 71-2 measures the period of a leading edge of an output from the switch 70 during the second counting interval (i.e., the period of an MHP) every time a leading edge is generated in the output from the switch 70 (step S102).

Figure 6:
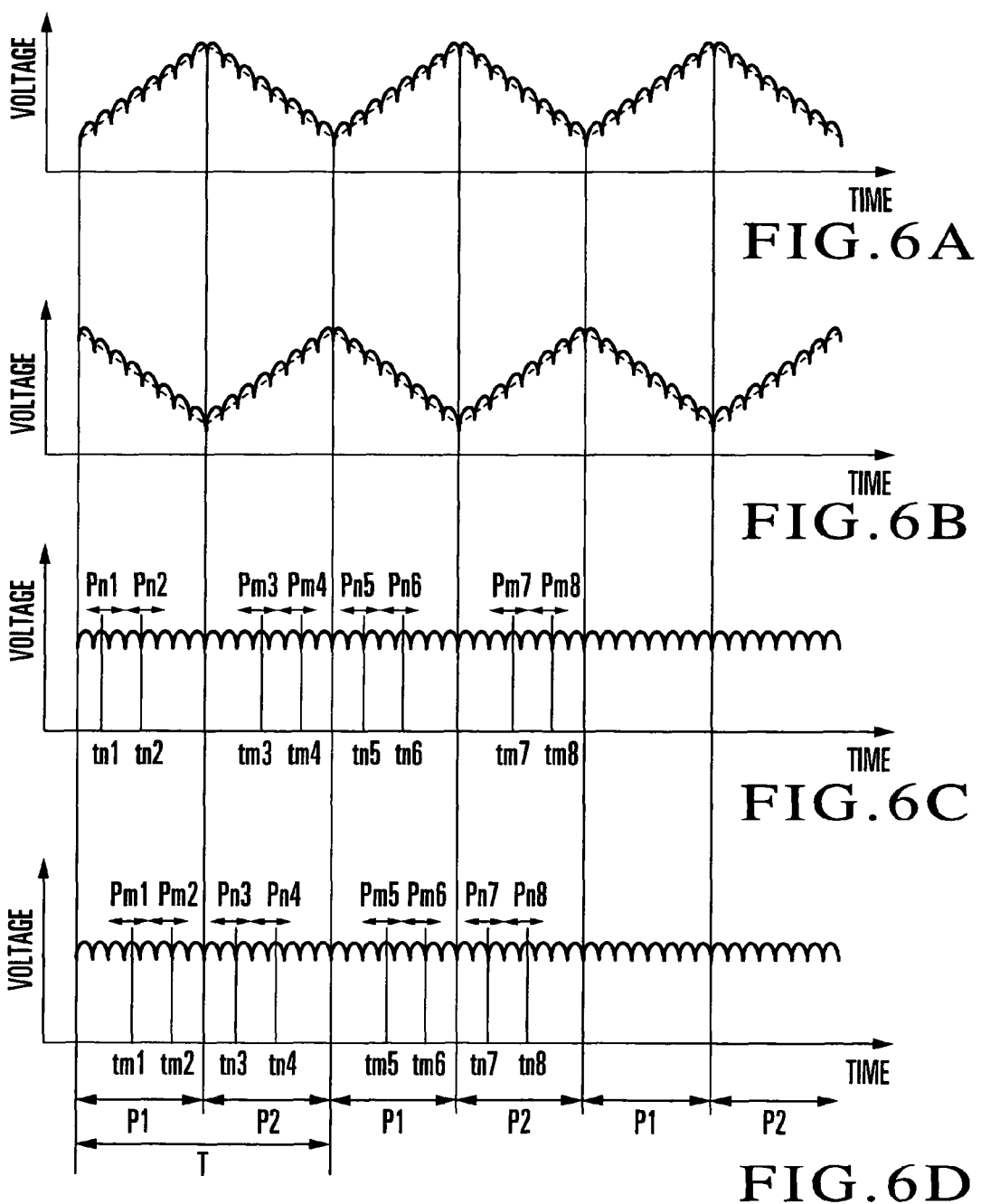
FIGS. 6A to 6D are timing charts each showing a counting interval of the counting device in FIG. 4.

The first and second counting intervals will be described with reference to FIGS. 6A to 6D. FIGS. 6A and 6B schematically show the output voltage waveforms of the current/voltage conversion amplifiers 5-1 and 5-2. FIGS. 6C and 6D schematically show the output voltage waveforms of the filter circuits 6-1 and 6-2. Reference symbols Pn1, Pn2, Pn3, Pn4, Pn5, Pn6, Pn7, and Pn8 denote the first counting intervals; Pm1, Pm2, Pm3, Pm4, Pm5, Pm6, Pm7, and Pm8, the second counting intervals; tn1, tn2, tn3, tn4, tn5, tn6, tn7, and tn8, the intermediate times of the first counting intervals Pn1, Pn2, Pn3, Pn4, Pn5, Pn6, Pn7, and Pn8; and tm1, tm2, tm3, tm4, tm5, tm6, tm7, and tm8, the intermediate times of the second counting intervals Pm1, Pm2, Pm3, Pm4, Pm5, Pm6, Pm7, and Pm8.

As shown in FIGS. 6C and 6D, a first counting interval Pn (Pn1, Pn2, Pn3, Pn4, Pn5, Pn6, Pn7, and Pn8) is set for one of outputs from the filter circuits 6-1 and 6-2 which corresponds to one of the semiconductor lasers 1-1 or 1-2 whose oscillation wavelength has increased, and a second counting interval Pm (Pm1, Pm2, Pm3, Pm4, Pm5, Pm6, Pm7, and Pm8) is set for one of outputs from the filter circuits 6-1 and 6-2 which corresponds to one of the semiconductor lasers 1-1 and 1-2 whose oscillation wavelength has decreased.

The first and second counting intervals Pn and Pm are preferably shorter than the first and second oscillation intervals P1 and P2, i.e., a time ½ the period T of a triangular wave. In addition, the first counting interval Pn needs to shift from the second counting interval Pm. Note however that the first counting interval Pn can partially overlap the second counting interval Pm. In addition, the first counting intervals Pn can partially overlap each other, and the second counting intervals Pm can partially overlap each other.

A gate signal GS1 input to the period measuring unit 71-1 is a signal which rises at the start of the first counting interval Pn, and falls at the end of the first counting interval Pn. A gate signal GS2 input to the period measuring unit 71-2 is a signal which rises at the start of the second counting interval Pm, and falls at the end of the second counting interval Pm.

The conversion unit 72-1 converts the average of the periods of MHPs measured by the period measuring unit 71-1 into an MHP count n per unit time in the first counting interval Pn (the number of interference waveforms from the semiconductor laser whose oscillation wavelength has increased). The conversion unit 72-2 converts the average of the periods of MHPs measured by the period measuring unit 71-2 into an MHP count m per unit time in the second counting interval Pm (the number of interference waveforms from the semiconductor laser whose oscillation wavelength has decreased) (step S103 in FIG. 5). Letting Ts be the average period of MHPs and f be the frequency of a triangular wave, the number of MHPs per unit can be calculated by $\{2/(f \times Ts)\}$. This unit time is a time ½ the period T of a triangular wave.

The counting device 7 performs the above processing in each of the first counting intervals Pn and each of the second counting intervals Pm. As is obvious from FIGS. 6C and 6D, the first and second counting intervals Pn and Pm alternately exist. In the first counting interval Pn, the period measuring unit 71-1 and the conversion unit 72-1 operate to calculate the MHP count n. In the second counting interval Pm, the period measuring unit 71-2 and the conversion unit 72-2 operate to calculate the MHP count m. In this manner, the MHP counts n and m are alternately obtained.

Figure 7:
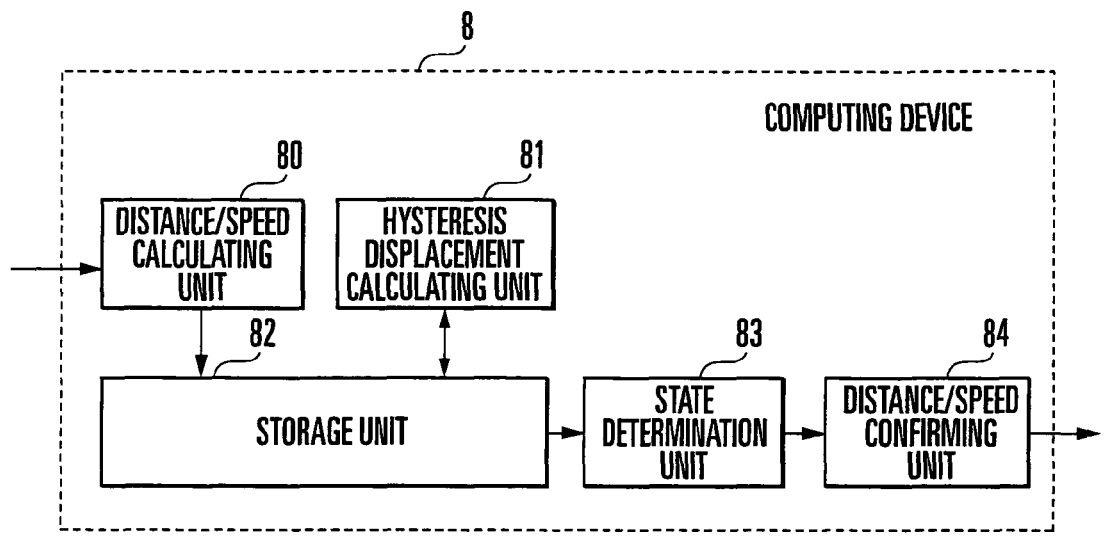
FIG. 7 is a block diagram showing an example of the arrangement of a computing device in the first embodiment of the present invention.
Figure 8:
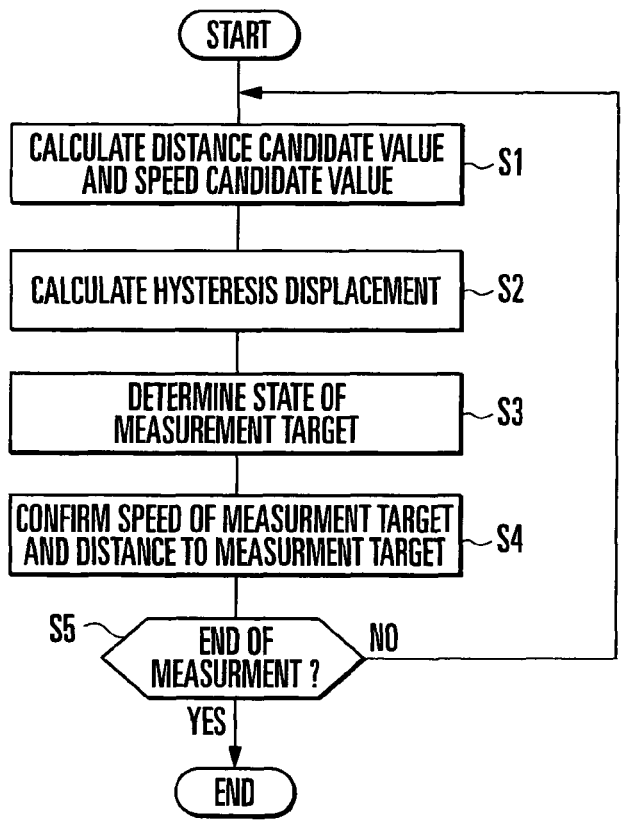
FIG. 8 is a flowchart showing the operation of the computing device in the first embodiment of the present invention.

The computing device 8 then calculates the distance to the measurement target 11 and the speed of the measurement target 11 on the basis of the minimum oscillation wavelength λa and maximum oscillation wavelength λb of the semiconductor lasers 1-1 and 1-2 and the counts n and m of MHPs. FIG. 7 shows an example of the arrangement of the computing device 8. FIG. 8 shows the operation of the computing device 8. The computing device 8 comprises a distance/speed calculating unit 80 which calculates a candidate value of the distance to the measurement target 11 and a candidate value of the speed of the measurement target 11 on the basis of the minimum oscillation wavelength λa and maximum oscillation wavelength λb of the semiconductor lasers 1-1 and 1-2 and the counts n and m of MHPs, a hysteresis displacement calculating unit 81 which calculates a hysteresis displacement as the difference between the distance candidate value calculated by the distance/speed calculating unit 80 and the immediately precedingly calculated distance candidate value, a storage unit 82 which stores the calculation results obtained by the distance/speed calculating unit 80 and the hysteresis displacement calculating unit 81, a state determination unit 83 which determines the state of the measurement target 11 on the basis of the calculation results obtained by the distance/speed calculating unit 80 and the hysteresis displacement calculating unit 81, and a distance/speed confirming unit 84 which confirms the distance to the measurement target 11 and the speed of the measurement target 11 on the basis of the determination result obtained by the state determination unit 83.

Assume that the state of the measurement target 11 is either a minute displacement state satisfying a predetermined condition or a displacement state indicating movement larger than that of the minute displacement state. Letting V be the average displacement of the measurement target 11 per period of the counting interval Pn and counting interval Pm, the minute displacement state is a state which satisfies $(\lambda b - \lambda a)/\lambda b > V/Lb$, and the displacement state is a state which satisfies $(\lambda b - \lambda a)/\lambda b \leq V/Lb$. Lb represents a distance at the time to (tn1, tn2, tn3, tn4, tn5, tn6, tn7, or tn8) or the time tm (tm1, tm2, tm3, tm4, tm5, tm6, tm7, or tm8). Note that the speed of the measurement target 11 can be obtained by normalizing the displacement V with the total time of the counting intervals Pn and Pm.

First of all, the distance/speed calculating unit 80 of the computing device 8 calculates a distance candidate values $L\alpha(t)$ and $L\beta(t)$ and speed candidate values $V\alpha(t)$ and $V\beta(t)$ at current time t according to the following equations, and stores the calculated values in the storage unit 82 (step S1 in FIG. 8):

$$L\alpha(t) = \lambda a \times \lambda b \times (MHP(t-1) + MHP(t))/\{4 \times (\lambda b - \lambda a)\} \quad (2)$$

$$L\beta(t) = \lambda a \times \lambda b \times (|MHP(t-1) - MHP(t)|)/\{4 \times (\lambda b - \lambda a)\} \quad (3)$$

$$V\alpha(t) = (MHP(t-1) - MHP(t)) \times \lambda b/4 \quad (4)$$

$$V\beta(t) = (MHP(t-1) + MHP(t)) \times \lambda b/4 \quad (5)$$

In equations (2) to (5), MHP(t) represents the number of MHPs calculated at current time t, and MHP(t−1) represents the number of MHPs calculated immediately before MHP(t). If, for example, MHP(t) is the count m calculated by the conversion unit 72-2 of the counting device 7, MHP(t−1) is the count n calculated by the conversion unit 72-1. In contrast, if MHP(t) is the count n calculated by the conversion unit 72-1, MHP(t−1) is the count m calculated by the conversion unit 72-2.

Note that equations (2) and (3) given above are based on the assumption that lasers without any mode hopping phenomenon are used as the semiconductor lasers 1-1 and 1-2. If lasers with the mode hopping phenomenon are to be used as the semiconductor lasers 1-1 and 1-2, equations (2A) and (3A) given below need to be used in place of equations (2) and (3) given above:

$$L\alpha(t) = \lambda a \times \lambda b \times (MHP(t-1) + MHP(t))/\{4 \times (\lambda b - \lambda a - \Sigma \lambda mp)\} \quad (2A)$$

$$L\beta(t) = \lambda a \times \lambda b \times (|MHP(t-1) - MHP(t)|)/\{4 \times (\lambda b - \lambda a - \Sigma \lambda mp)\} \quad (3A)$$

where λmp represents the magnitude of the width of frequencies made discontinuous by the mode hopping phenomenon. If a plurality of mode hopping phenomena occur in one interval t, the magnitudes λmp are almost the same. Σλmp represents the value obtained by adding all the magnitudes Amp of the widths of frequencies made discontinuous by the mode hopping phenomena which have occurred in one interval t.

Candidate values $L\alpha(t)$ and $V\alpha(t)$ are the values calculated on the assumption that the measurement target 11 is in the minute displacement state, and candidate values $L\beta(t)$ and $V\beta(t)$ are the values calculated on the assumption that the measurement target 11 is in the displacement state. The computing device 8 calculates equations (2) to (5) every time the counting device 7 measures the number of MHPs.

Subsequently, the hysteresis displacement calculating unit 81 of the computing device 8 calculates hysteresis displacements as the differences between distance candidate values at current time t and distance candidate values at the immediately preceding time, which are stored in the storage unit 82, in both the minute displacement state and the displacement state according to the following equations, and stores them in the storage unit 82 (step S2 in FIG. 8). Note that $L\alpha(t-1)$ and $L\beta(t-1)$ in equations (6) and (7) represent distance candidate values calculated at the time immediately preceding current time t.

$$V\text{cal}\alpha(t) = L\alpha(t) - L\alpha(t-1) \quad (6)$$

$$V\text{cal}\beta(t) = L\beta(t) - L\beta(t-1) \quad (7)$$

A hysteresis displacement $V\text{cal}\alpha(t)$ is the value calculated on the assumption that the measurement target 11 is in the minute displacement state, and a hysteresis displacement $V\text{cal}\beta(t)$ is the value calculated on the assumption that the measurement target 11 is in the displacement state. The computing device 8 calculates equations (6) and (7) every time the counting device 7 calculates the number of MHPs. Note that in equations (4) to (7), the direction in which the measurement target 11 approaches the distance/speed meter of this embodiment is defined as a positive speed, and the direction in which the measurement target 11 moves away from the meter is defined as a negative speed.

The state determination unit 83 of the computing device 8 determines the state of the measurement target 11 by using the calculation results on equations (2) to (7) stored in the storage unit 82 (step S3 in FIG. 8).

As disclosed in reference 1, when the measurement target 11 moves in the minute displacement state (uniform motion), the hysteresis displacement $V\text{cal}\alpha(t)$ calculated on the assumption that the measurement target 11 is in the minute displacement state is constant in sign, and the speed candidate value $V\alpha(t)$ calculated on the assumption that the measurement target 11 is in the minute displacement is equal to the absolute average value of the hysteresis displacement $V\text{cal}\alpha(t)$. When the measurement target 11 moves at a uniform speed in the minute displacement state, the hysteresis displacement $V\text{cal}\beta(t)$ calculated on the assumption that the measurement target 11 is in the displacement state is inverted every time the number of MHPs is calculated.

The state determination unit 83 therefore determines that the measurement target 11 is in the minute displacement state and in uniform motion, if the hysteresis displacement $V\text{cal}\alpha(t)$ calculated on the assumption that the measurement target 11 is in the minute displacement state is constant in sign, and the speed candidate value $V\alpha(t)$ calculated on the assumption that the measurement target 11 is in the minute displacement state is equal to the absolute average value of the hysteresis displacement $V\text{cal}\alpha(t)$.

As disclosed in reference 1, when the measurement target 11 moves in the displacement state (uniform motion), the hysteresis displacement $V\text{cal}\beta(t)$ calculated on the assumption that the measurement target 11 in the displacement state is constant in sign, and the speed candidate value Vβ(t) calculated on the assumption that the measurement target 11 is in the displacement is equal to the absolute average value of the hysteresis displacement Vcalβ(t). When the measurement target 11 is moving at a uniform speed in the displacement state, the hysteresis displacement Vcalα(t) calculated on the assumption that the measurement target 11 is in the minute displacement state is inverted every time the number of MHPs is calculated.

The state determination unit 83 therefore determines that the measurement target 11 is in the displacement state and in uniform motion, if the hysteresis displacement Vcalβ(t) calculated on the assumption that the measurement target 11 is in the displacement state is constant in sign, and the speed candidate value Vβ(t) calculated on the assumption that the measurement target 11 is in the displacement state is equal to the absolute average value of the hysteresis displacement Vcalβ(t).

As disclosed in reference 1, when the measurement target 11 is in the minute displacement state and in motion other than uniform motion, the speed candidate value Vα(t) calculated on the assumption that the measurement target 11 in the minute displacement state is not equal to the absolute average value of the hysteresis displacement Vcalα(t) calculated on the assumption that the measurement target 11 is in the minute displacement. Likewise, the speed candidate value Vβ(t) calculated on the assumption that the measurement target 11 in the displacement state is not equal to the absolute average value of the hysteresis displacement Vcalβ(t) calculated on the assumption that the measurement target 11 is in the displacement state.

When the measurement target 11 is in the minute displacement state and in motion other than uniform motion, the sign of the hysteresis displacement Vcalα(t) calculated on the assumption that the measurement target 11 is in the minute displacement state is inverted every time the number of MHPs is calculated. In this case, although the sign of the hysteresis displacement Vcalβ(t) calculated on the assumption that the measurement target 11 is in the displacement state changes, the change does not occur every time the number of MHPs is calculated.

The state determination unit 83 therefore determines that the measurement target 11 is in the minute displacement state and in motion other than uniform motion, when the sign of the hysteresis displacement Vcalα(t) calculated on the assumption that the measurement target 11 is in the minute displacement state is inverted every time the number of MHPs is calculated, and the speed candidate value Vα(t) calculated on the assumption that the measurement target 11 is in the minute displacement state is not equal to the absolute average value of the hysteresis displacement Vcalα(t).

Consider the speed candidate value Vβ(t). The absolute value of Vβ(t) is a constant and equal to the value obtained by multiplying the distance candidate value Lα(t) calculated on the assumption that the measurement target 11 is in the minute displacement state by a wavelength change rate (λb−λa)/λb of the semiconductor lasers 1-1 and 1-2. The state determination unit 83 therefore can determine that the measurement target 11 is in the minute displacement state and in motion other than uniform motion, if the absolute value of the speed candidate value Vβ(t) calculated on the assumption that the measurement target 11 is in the displacement state is equal to the value obtained by multiplying the distance candidate value Lα(t) by the wavelength change rate (λb−λa)/λb, and the speed candidate value Vα(t) calculated on the assumption that the measurement target 11 is in the minute displacement state is not equal to the absolute average value of the hysteresis displacement Vcalα(t).

As disclosed in reference 1, when the measurement target 11 is in the displacement state and in motion other than uniform motion, the speed candidate value Vα(t) calculated on the assumption that the measurement target 11 is in the minute displacement state is not equal to the absolute average value of the hysteresis displacement Vcalα(t) calculated on the assumption that the measurement target 11 is in the minute displacement state, and the speed candidate value Vβ(t) calculated on the assumption that the measurement target 11 is in the displacement state is not equal to the absolute average value of the hysteresis displacement Vcalβ(t) calculated on the assumption that the measurement target 11 is in the displacement state.

In addition, when the measurement target 11 is in the displacement state and in motion other than uniform motion, the sign of the hysteresis displacement Vcalβ(t) calculated on the assumption that the measurement target 11 is in the displacement state is inverted every time the number of MHPs is calculated. In this case, although the sign of the hysteresis displacement Vcalα(t) calculated on the assumption that the measurement target 11 is in the minute displacement state changes, the change does not occur every time the number of MHPs is calculated.

The state determination unit 83 therefore determines that the measurement target 11 is in the displacement state and in motion other than uniform motion, when the sign of the hysteresis displacement Vcalβ(t) calculated on the assumption that the measurement target 11 is in the displacement state is inverted every time the number of MHPs is calculated, and the speed candidate value Vβ(t) calculated on the assumption that the measurement target 11 is in the displacement state is not equal to the absolute average value of the hysteresis displacement Vcalβ(t).

Consider the speed candidate value Vα(t). The absolute value of Vα(t) is a constant and equal to the value obtained by multiplying the distance candidate value Lβ(t) calculated on the assumption that the measurement target 11 is in the displacement state by the wavelength change rate (λb−λa)/λb of the semiconductor lasers 1-1 and 1-2. The state determination unit 83 therefore may determine that the measurement target 11 is in the displacement state and in motion other than uniform motion, if the absolute value of the speed candidate value Vα(t) calculated on the assumption that the measurement target 11 is in the minute displacement state is equal to the value obtained by multiplying the distance candidate value Lp(t) by the wavelength change rate (λb−λa)/λb, and the speed candidate value Vβ(t) calculated on the assumption that the measurement target 11 is in the displacement state is not equal to the absolute average value of the hysteresis displacement Vcalβ(t).

Table 1 shows the above determining operation of the state determination unit 83.

TABLE 1

| | | Hysteresis Displacement | | Speed Candidate Value | |
|---|---|---|---|---|---|
| | | Vcalα(t) | Vcalβ(t) | Vα(t) | Vβ(t) |
| Movement | Minute Displacement State | sign is constant speed candidate value is equal to absolute average value of hysteresis displacement | inverted at every sign period | — | — |
| | Displacement State | inverted at every sign period | sign is constant speed candidate value is equal to absolute average value of hysteresis displacement | — | — |
| Vibration | Minute Displacement State | inverted at every sign period speed candidate value is not equal to absolute average value of hysteresis displacement | — | — | absolute speed candidate value is equal to value obtained by multiplying distance candidate value calculated on assumption that measurement target is in minute displacement state by wavelength change rate |
| | Displacement State | — | inverted at every sign period speed candidate value is not equal to absolute average value of hysteresis displacement | absolute speed candidate value is equal to value obtained by multiplying distance candidate value calculated on assumption that measurement target is in displacement state by wavelength change rate | |

The distance/speed confirming unit 84 of the computing device 8 confirms the speed of the measurement target 11 and the distance to the measurement target 11 on the basis of the determination result obtained by the state determination unit 83 (step S4 in FIG. 8).

That is, if it is determined that the measurement target 11 is moving at a uniform speed in the minute displacement state, the distance/speed confirming unit 84 confirms that the speed candidate value Vα(t) is the speed of the measurement target 11, and the distance candidate value Lα(t) is the distance to the measurement target 11. If it is determined that the measurement target 11 is moving at a uniform speed in the displacement state, the distance/speed confirming unit 84 confirms that the speed candidate value Vβ(t) is the speed of the measurement target 11, and the distance candidate value Lβ(t) is the distance to the measurement target 11.

In addition, if it is determined that the measurement target 11 is in the minute displacement state and in motion other than uniform motion, the distance/speed confirming unit 84 confirms that the speed candidate value Vα(t) is the speed of the measurement target 11, and the distance candidate value Lα(t) is the distance to the measurement target 11. If it is determined that the measurement target 11 is in the displacement state and in motion other than uniform motion, the distance/speed confirming unit 84 confirms that the speed candidate value Vβ(t) is the speed of the measurement target 11, and the distance candidate value Lβ(t) is the distance to the measurement target 11. Note that the actual distance is the average value of the distance candidate values Lβ(t).

Note that depending on the magnitude relationship between MHP(t−1) and MHP(t), Vβ(t) always takes a positive value, and Vα(t) takes a positive or negative value. However, these signs do not express the direction of the speed of the measurement target 11. When the number of MHPs from the semiconductor laser whose oscillation wavelength has increased is larger than that from the semiconductor laser whose oscillation wavelength has decreased, i.e., n>m, the speed of the measurement target 11 has a positive direction (a direction to approach the laser).

The computing device 8 performs the above processing in steps S1 to S4 every time the counting device 7 calculates the number of MHPs until, for example, the user issues an instruction to finish measurement (YES in step S5 in FIG. 8).

The display device 9 displays the speed of the measurement target 11 and the distance to the measurement target 11 which are calculated by the computing device 8.

The amplitude adjusting device 10 controls the laser drivers 4-1 and 4-2 so as to properly adjust the amplitudes of triangular wave driving currents for the semiconductor lasers 1-1 and 1-2 by using the determination result obtained by the state determination unit 83 of the computing device 8. The amplitude adjusting device 10 performs amplitude adjustment by using one of the speed candidate values Vα(t) and Vβ(t) calculated by the distance/speed calculating unit 80 of the computing device 8 which is determined not to be a true value by the state determination unit 83 and is not be selected. If it is determined that the measurement target 11 is in the minute displacement state and in uniform motion or motion other than uniform motion, the speed candidate value that is not selected by the state determination unit 83 is Vβ(t). If it is determined that the measurement target 11 is in the displacement state and in uniform motion or motion other than uniform motion, the speed candidate value that is not selected by the state determination unit 83 is Vα(t).

The amplitude adjusting device 10 adjusts the amplitudes of triangular wave driving currents through the laser drivers 4-1 and 4-2 to make the speed candidate value, which is not selected by the state determination unit 83, become almost equal to the value obtained by multiplying the distance candidate value, selected upon being determined as a true value by the state determination unit 83, by the wavelength change rate (λb−λa)/λb of the semiconductor lasers 1-1 and 1-2. At this time, the amplitude adjusting device 10 can adjust both or one of the amplitude of the driving current supplied from the laser driver 4-1 to the semiconductor laser 1-1 and the amplitude of the driving current supplied from the laser driver 4-2 to the semiconductor laser 1-2.

Figure 9:
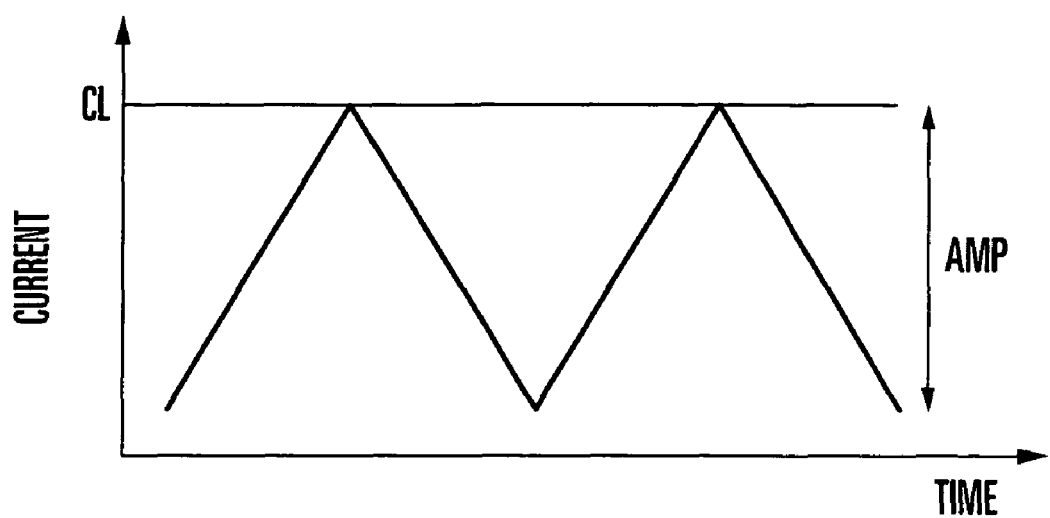
FIG. 9 is a timing chart for explaining a method of adjusting the amplitude of a triangular wave driving current supplied from a laser driver to the semiconductor laser in the first embodiment of the present invention.

FIG. 9 explains a method of adjusting the amplitudes of the triangular wave driving currents supplied from the laser drivers 4-1 and 4-2 to the semiconductor lasers 1-1 and 1-2. The laser drivers 4-1 and 4-2 adjust amplitudes AMP of driving currents by increasing or decreasing the minimum value of driving currents while fixing the maximum values of driving currents to a predetermined value (fixed to an upper limit value CL defined by the semiconductor lasers 1-1 and 1-2 in the case shown in FIG. 9) in accordance with an instruction from the amplitude adjusting device 10. This makes it possible to set the amplitude of each driving current to a proper value.

In the distance/speed meter using the plurality of semiconductor lasers 1-1 and 1-2 as in this embodiment, the difference between the absolute values of the wavelength change amounts in the semiconductor lasers 1-1 and 1-2 will cause an error in a measurement value. As in this embodiment, therefore, adjusting the amplitudes of triangular wave driving currents can make the absolute values of the wavelength change amounts in the semiconductor lasers 1-1 and 1-2 equal to each other, thereby reducing distance and speed measurement errors.

This embodiment adjusts the amplitudes of triangular wave driving currents to make the speed candidate value which is not selected by the state determination unit 83 become equal to the value obtained by multiplying the distance candidate value, selected upon being determined as a true value by the state determination unit 83, by the wavelength change rate (λb−λa)/λb. However, the speed candidate value needs not be completely equal to the value obtained by multiplying the distance candidate value by the wavelength change rate, but may be almost equal thereto.

As described above, in this embodiment, the semiconductor lasers 1-1 and 1-2 are made to alternately repeat the first oscillation interval in which the oscillation wavelengths of the semiconductor lasers 1-1 and 1-2 continuously increase and the second oscillation interval in which the oscillation wavelengths continuously decrease, and the numbers of MHPs contained in output signals from the photodiodes 2-1 and 2-2 are counted in each of the first oscillation interval and the second oscillation interval. The embodiment then can calculate the distance to the measurement target 11 and the speed of the measurement target 11 from the minimum oscillation wavelength λa and the maximum oscillation wavelength λb of the semiconductor lasers 1-1 and 1-2. As a result, this embodiment can measure not only the distance to the measurement target 11 but also the speed of the measurement target 11 while making the most of the advantages of a conventional self-mixing laser measurement instrument, i.e., (a) capability of downsizing the apparatus, (b) unnecessity of a high-speed circuit, (c) robustness against disturbance light, and (d) capability of being applied to any type of measurement target. In addition, this embodiment can determine whether the measurement target 11 is in uniform motion or in motion other than uniform motion.

In addition, this embodiment causes the semiconductor lasers 1-1 and 1-2, whose oscillation wavelengths increase and decrease inversely to each other, to simultaneously emit parallel laser light beams to the measurement target 11, obtains the MHP count n in an output from the photodiode 2-1 or 2-2 in the first counting interval Pn shorter than the first oscillation interval and the second oscillation interval, and obtains the MHP count m in an output from the photodiode 2-2 or 2-1 in the second counting interval Pm shorter than the first oscillation interval and the second oscillation interval and at least partially different in time from the first counting interval Pn. This makes it possible to measure a distance and a speed in a period of time shorter than that in the distance/speed meter disclosed in reference 1. The distance/speed meter disclosed in reference 1 needs to count the number of MHPs at least three times in, for example, a first oscillation interval t−1, second oscillation interval t, and first oscillation interval t+1. In this embodiment, it suffices to count the number of MHPs at least three times in, for example, in the first counting interval Pn2, second counting interval Pm1, and first counting interval Pn2.

In this embodiment, equalizing the absolute values of the oscillation change amounts of the semiconductor lasers 1-1 and 1-2 can improve the measurement accuracy of distances and speeds.

Note that the speeds and distances calculated in this embodiment correspond to values at intermediate times between the times to (tn1, tn2, tn3, tn4, tn5, tn6, tn7, and tn8) and the times tm (tm1, tm2, tm3, tm4, tm5, tm6, tm7, and tm8). The speed and distance calculated by using the MHP count n in the first counting interval Pn1 and the MHP count m in the second counting interval Pm1 are values at intermediate times between times tn1 and tm1. The speed and distance calculated by using the MHP count m in the second counting interval Pm1 and the MHP count n in the first counting interval Pn2 are values at intermediate times between times tm1 and tn2. The counting device 7 shown in FIG. 4 may incorporate a time calculating unit which calculates times corresponding to calculated speed and distance values.

Second Embodiment

Figure 10:
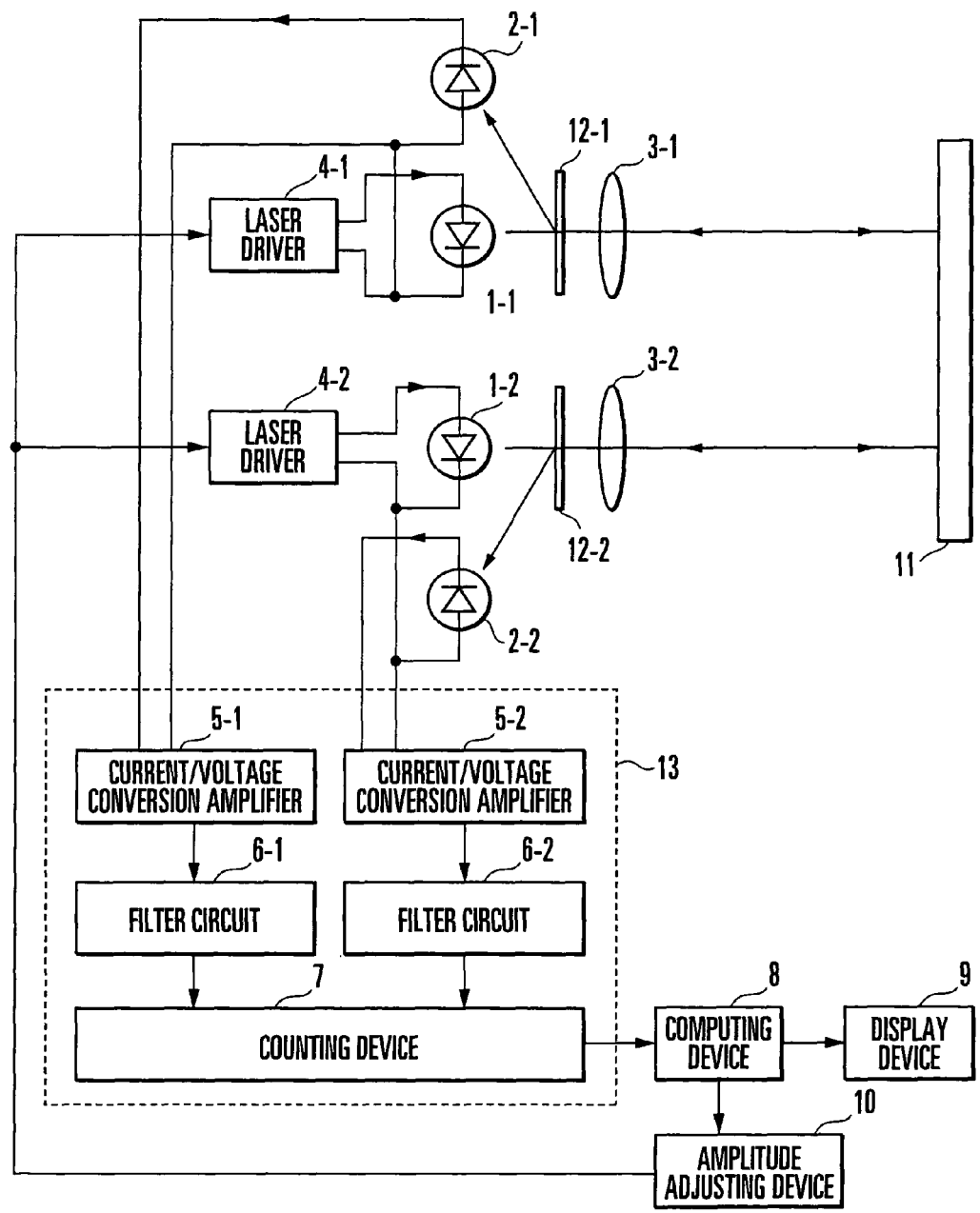
FIG. 10 is a block diagram showing the arrangement of a distance/speed meter according to the second embodiment of the present invention.

The first embodiment has exemplified the case in which the present invention is applied to a self-mixing type interferometer. However, the present invention can also be applied to interferometers other than self-mixing type interferometers. FIG. 10 shows the arrangement of a distance/speed meter according to the second embodiment of the present invention. The same reference numerals as in FIG. 1 denote the same components in FIG. 10. Referring to FIG. 10, reference numerals 12-1 and 12-2 denote beam splitters which split incident light and reflected light.

As in the first embodiment, laser light beams from semiconductor lasers 1-1 and 1-2 are applied parallel to a measurement target 11. The laser beams passing through the beam splitters 12-1 and 12-2 and lenses 3-1 and 3-2 strike the measurement target 11. In this embodiment, light beams from the semiconductor lasers 1-1 and 1-2 which are reflected by the measurement target 11 are split from incident light beams to the measurement target 11 and guided to photodiodes 2-1 and 2-2.

Since the arrangement comprising the photodiodes 2-1 and 2-2 and subsequent components is the same as that in the first embodiment, a description of the arrangement will be omitted. In this manner, with an interferometer other than the self-mixing type, the same effects as those of the first embodiment can be obtained.

Note that the counting device 7 and the computing unit 8 in the first and second embodiments can be implemented by, for example, a computer including a CPU, storage device, and interface and programs which control these hardware resources. Programs for operating such a computer are provided while being recorded on a recording medium such as a flexible disk, CD-ROM, DVD-ROM, or memory card. The CPU writes a read program in the storage device, and executes processing described in first and second embodiments in accordance with the program.

In the first and second embodiments, when the measurement target 11 is vibrating (at, for example, a maximum speed of 2 nm) with a very small displacement, although a change (amplitude) in actual distance is several nm, since the resolution of distance calculation is lower than the displacement resolution, a large error occurs. When, therefore, a measurement target is in motion with a very small displacement, an improvement in accuracy can be achieved by setting, as a change in distance, the value obtained by integrating displacements (speeds), instead of a calculation result.

Figure 11:
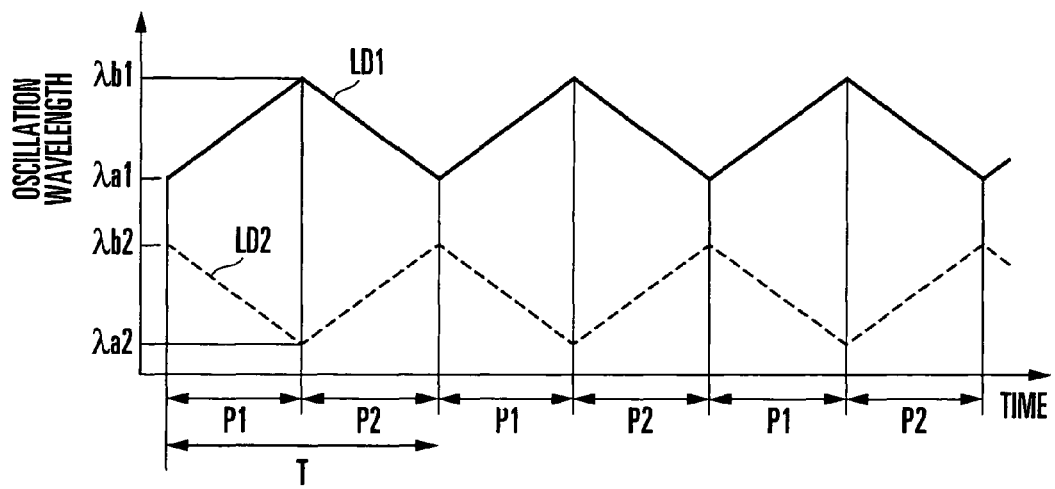
FIG. 11 is a timing chart showing another example of a temporal change in the oscillation wavelength of each of the semiconductor lasers in the first and second embodiments of the present invention.

The first and second embodiments have exemplified the case in which the semiconductor lasers 1-1 and 1-2 have the same minimum oscillation wavelength $\lambda a$ and the same minimum oscillation wavelength $\lambda b$. However, the present invention is not limited to this. As shown in FIG. 11, the semiconductor lasers 1-1 and 1-2 may have different minimum oscillation wavelengths $\lambda a$ and different maximum oscillation wavelengths $\lambda b$. Referring to FIG. 11, reference symbols $\lambda a1$ and $\lambda b1$ denote the minimum and maximum oscillation wavelengths of the semiconductor laser 1-1; and $\lambda a2$ and $\lambda b2$ denote the minimum and maximum oscillation wavelengths of the semiconductor laser 1-2. In this case, it suffices if $\lambda a1 \times \lambda b1/\{4 \times (\lambda b1 - \lambda a1)\}$ and $\lambda a2 \times \lambda b2/\{4 \times (\lambda b2 - \lambda a2)\}$ are always the same fixed value. In this case, as $\lambda a$ and $\lambda b$ in equations (2) to (5), (2A), and (3A), either $\lambda a1$ and $\lambda b1$ or $\lambda a2$ and $\lambda b2$ can be used.

Figure 12:
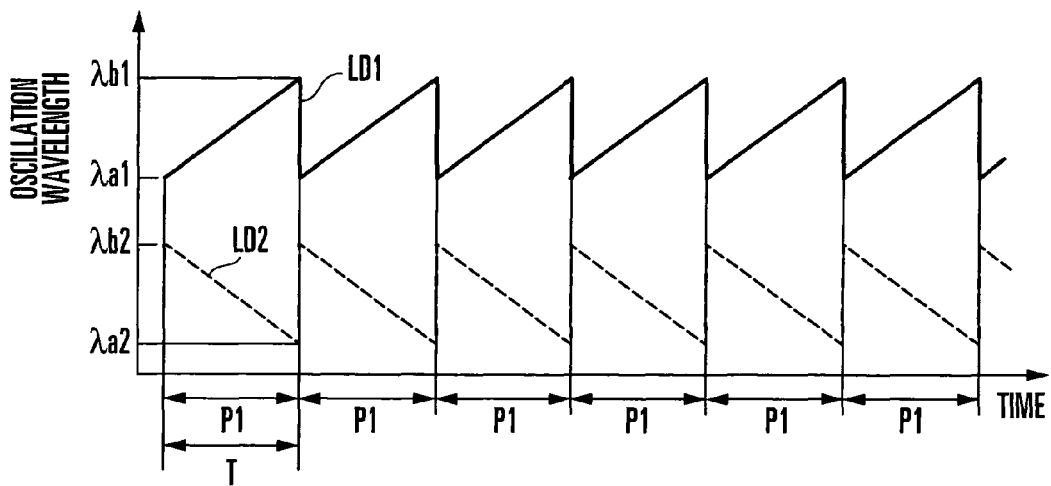
FIG. 12 is a timing chart showing still another example of a temporal change in the oscillation wavelength of each of the semiconductor lasers in the first and second embodiments of the present invention.
Figure 13:
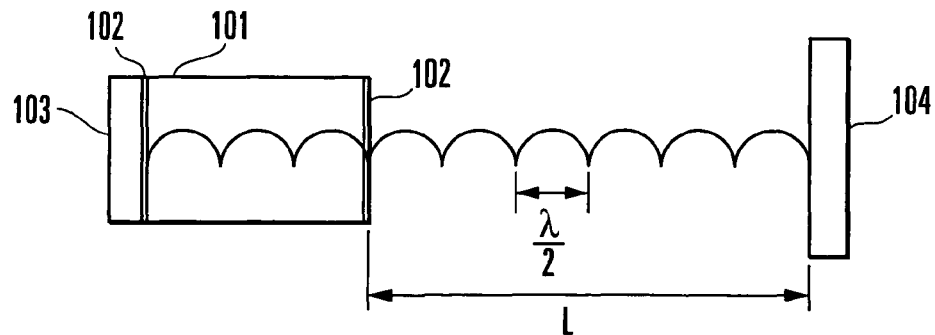
FIG. 13 is a view showing a complex cavity model of a semiconductor laser in a conventional laser measuring instrument.
Figure 14:
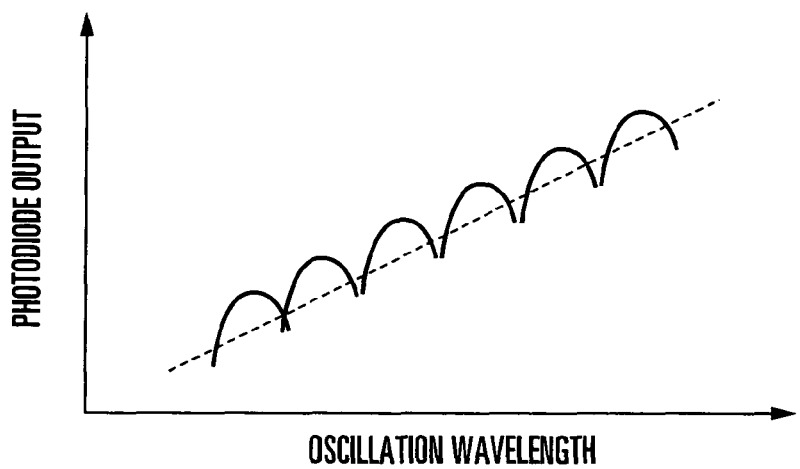
FIG. 14 is a graph showing the relationship between the oscillation wavelength of a semiconductor laser and the output waveform of a built-in photodiode.
Figure 15:
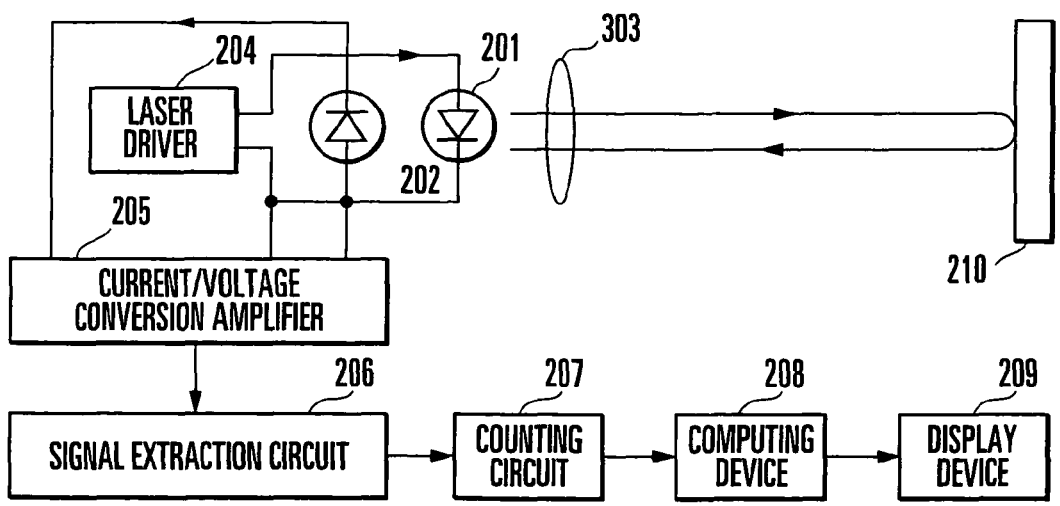
FIG. 15 is a block diagram showing the arrangement of a conventional distance/speed meter.
Figure 16:
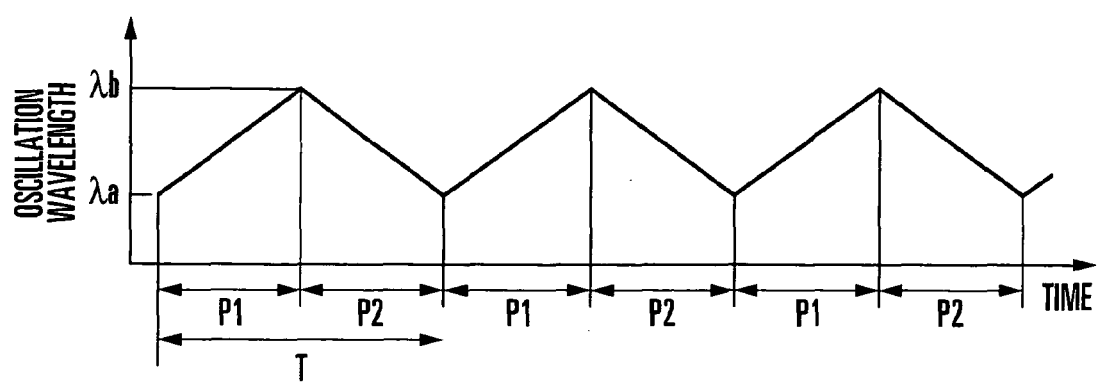
FIG. 16 is a timing chart showing an example of a temporal change in the oscillation wavelength of a semiconductor laser in the distance/speed meter in FIG. 15.

In addition, in the first and second embodiments, the semiconductor lasers 1-1 and 1-2 are oscillated in a triangular waveform. However, the present invention is not limited to this. As shown in FIG. 12, the semiconductor lasers 1-1 and 1-2 may be oscillated in a sawtooth waveform. That is, in the present invention, it suffices to operate the semiconductor laser 1-1 such that at least the first oscillation interval P1 repeatedly exists while operating the semiconductor laser 1-2 such that its oscillation wavelength increases and decreases inversely relative to the semiconductor laser 1-1. As in the case shown in FIG. 11, it suffices to set $\lambda a1 \neq \lambda a2$ and $\lambda b1 \neq \lambda b2$. As in the case shown in FIG. 2, it suffices to set $\lambda a1 = \lambda a2$ and $\lambda b1 = \lambda b2$.

The operation in a first oscillation interval P1 is the same as that in the case of triangular wave oscillation. When, however, the semiconductor lasers 1-1 and 1-2 are to be oscillated in a sawtooth waveform, it is necessary to fix the output of a switch 70 of a counting device 7. That is, the switch 70 always connects the output of a filter circuit 6-1 to the input of a period measuring unit 71-1, and always connects the output of a filter circuit 6-2 to the input of a period measuring unit 71-2.

Note that when the semiconductor lasers 1-1 and 1-2 are to be oscillated in a triangular waveform, the amplitude adjustment can be performed by the amplitude adjusting device 10 regardless of the state of the measurement target 11. When the semiconductor lasers 1-1 and 1-2 are to be oscillated in a sawtooth waveform, amplitude adjustment can be performed only when the measurement target 11 is a stationary state.

The present invention can be applied to a technique of measuring the distance to a measurement target and the speed of the measurement target.

Interference type distance meters are based on the absolute requirement that when the distance to a measurement target is to be measured, the measurement target needs to be stationary. In contrast to this, the present invention can measure the distance to a measurement target which is not stationary. That is, the present invention can simultaneously measure the speed (magnitude and direction) of a measurement target and the distance to the measurement target. In addition, the present invention can determine, on the basis of the minimum and maximum oscillation wavelengths of the laser measuring instrument and the counting result obtained by the counting means, whether the measurement target is in uniform motion or in motion other than uniform motion. Furthermore, the present invention causes the first and second semiconductor lasers, whose oscillation wavelengths increase and decrease inversely to each other, to simultaneously emit parallel laser beams to a measurement target, and counts the numbers of interference waveforms contained in output signals from the first and second light-receiving devices for the respective output signals form the first and second light-receiving devices, thereby measuring a distance and a speed in a time shorter than that in the prior art.

The present invention adjusts the amplitude of at least one of driving currents supplied from the first and second laser drivers to the first and second semiconductor lasers such that a speed candidate, of speed candidate values obtained on the assumption that a measurement target is in the minute displacement state and on the assumption that the measurement target is in the displacement state, which is not selected upon being determined not to be a true value by the state determination unit becomes almost equal to the value obtained by multiplying the distance candidate value selected upon being determined as a true value by the state determination unit by the wavelength change rate of the first and second semiconductor lasers. This can make the absolute values of the wavelength change amounts of the first and second semiconductor lasers equal to each other, thereby improving the measurement accuracy of distances and speeds.

What is claimed is:

1. A distance/speed meter comprising:

a first semiconductor laser which emits first laser light to a measurement target;

a second semiconductor laser which emits second laser light to the measurement target parallelly to the first laser light;

a first laser driver which drives said first semiconductor laser such that an oscillation interval in which at least an oscillation wavelength monotonically increases repeatedly exists;

a second laser driver which drives said second semiconductor laser such that an oscillation wavelength increases/decreases inversely to the oscillation wavelength of said first semiconductor laser;

a first light-receiving device which converts at least an optical output from said first semiconductor laser into an electrical signal;

a second light-receiving device which converts at least an optical output from said second semiconductor laser into an electrical signal;

counting means for counting the number of interference waveforms generated by the first laser light and return light of the laser light from the measurement target and contained in an output signal from said first light-receiving device, and the number of interference waveforms generated by the second laser light and return light of the laser light from the measurement target and contained in an output signal from said second light-receiving device; and computing means for calculating at least one of a distance to the measurement target and a speed of the measurement target from a minimum oscillation wavelength and a maximum oscillation wavelength of said first semiconductor laser and said second semiconductor laser and a counting result obtained by said counting means, wherein said counting means obtains the number of interference waveforms contained in an output signal from said light-receiving device corresponding to a semiconductor laser, of said first semiconductor laser and said second semiconductor laser, whose oscillation wavelength has increased, in a first counting interval shorter than the oscillation interval, obtains the number of interference waveforms contained in an output signal from said light-receiving device corresponding to a semiconductor laser, of said first semiconductor laser and said second semiconductor laser, whose oscillation wavelength has decreased, in a second counting interval shorter than the oscillation interval and at least partially different in time from the first counting interval, and alternately obtains the numbers of interference waveforms from an output signal from said light-receiving device corresponding to said semiconductor laser whose oscillation wavelength has increased and from an output signal from said light-receiving device corresponding to said semiconductor laser whose oscillation wavelength has decreased.

2. A meter according to claim 1, wherein
said first light-receiving device converts the first laser light and the return light thereof into electrical signals, and
said second light-receiving device converts the second laser light and the return light thereof into electrical signals.

3. A meter according to claim 1, wherein said counting means counts the number of interference waveforms generated by a self-mixing effect between the first laser light, the second laser light, the return light of the first laser light, and the return light of the second laser light.

4. A meter according to claim 1, wherein said computing means comprises
a distance/speed calculating unit which calculates a candidate value of a distance to a measurement target and a candidate value of a speed of the measurement target on the basis of a minimum oscillation wavelength and a maximum oscillation wavelength of said first semiconductor laser and said second semiconductor laser and a counting result obtained by said counting means,
a hysteresis displacement calculating unit which calculates a hysteresis displacement as a difference between a distance candidate value calculated by said distance/speed calculating unit and a previously calculated distance candidate value,
a state determination unit which determines a state of the measurement target on the basis of calculation results obtained by said distance/speed calculating unit and said hysteresis displacement calculating unit, and
a distance/speed confirming unit which confirms at least one of the distance to the measurement target and the speed of the measurement target on the basis of a determination result obtained by said state determination unit.

5. A meter according to claim 4, wherein
said distance/speed calculating unit and said hysteresis displacement calculating unit calculate distance candidate values and speed candidate values on the assumption that the measurement target is in a minute displacement state and on the assumption that the measurement target is in a displacement state in which the measurement target moves faster than in the minute displacement state, assuming that the measurement target is in one of the minute displacement state and the displacement state, every time said counting means obtains the number of interference waveforms, and
said state determination unit determines whether the measurement target is in the minute displacement state or the displacement state and also determines whether the measurement target is in uniform motion or in motion other than uniform motion, on the basis of calculation results obtained by said distance/speed calculating unit and said hysteresis displacement calculating unit, every time said distance/speed calculating unit and said hysteresis displacement calculating unit perform calculation.

6. A meter according to claim 5, wherein said state determination unit determines that the measurement target is in the minute displacement state and in uniform motion, when a sign of the hysteresis displacement calculated on the assumption that the measurement target is in the minute displacement state is constant and a speed candidate value calculated on the assumption that the measurement target is in the minute displacement state is equal to an absolute average value of hysteresis displacement calculated on the assumption that the measurement target is in the minute displacement state.

7. A meter according to claim 5, wherein said state determination unit determines that the measurement target is in the displacement state and in uniform motion, when a sign of the hysteresis displacement calculated on the assumption that the measurement target is in the displacement state is constant and a speed candidate value calculated on the assumption that the measurement target is in the displacement state is equal to an absolute average value of hysteresis displacement calculated on the assumption that the measurement target is in the displacement state.

8. A meter according to claim 5, wherein said state determination unit determines that the measurement target is in the minute displacement state and in motion other than uniform motion, when a sign of the hysteresis displacement calculated on the assumption that the measurement target is in the minute displacement state is inverted every time a hysteresis displacement is calculated and a speed candidate value calculated on the assumption that the measurement target is in the minute displacement state is not equal to an absolute average value of hysteresis displacement calculated on the assumption that the measurement target is in the minute displacement state.

9. A meter according to claim 5, wherein said state determination unit determines that the measurement target is in the minute displacement state and in motion other than uniform motion, when an absolute value of a speed candidate value calculated on the assumption that the measurement target is in the displacement state is equal to a value obtained multiplying a distance candidate value calculated on the assumption that the measurement target is in the minute displacement state by a wavelength change rate of said first semiconductor laser and said second semiconductor laser, and a speed candidate value calculated on the assumption that the measurement target is in the minute displacement state is not equal to an absolute average hysteresis displacement calculated on the assumption that the measurement target is in the minute displacement state.

10. A meter according to claim 5, wherein said state determination unit determines that the measurement target is in the displacement state and in motion other than uniform motion, when a sign of the hysteresis displacement calculated on the assumption that the measurement target is in the displacement state is inverted every time a hysteresis displacement is calculated and a speed candidate value calculated on the assumption that the measurement target is in the displacement state is not equal to an absolute average value of hysteresis displacement calculated on the assumption that the measurement target is in the displacement state.

11. A meter according to claim 5, wherein said state determination unit determines that the measurement target is in the displacement state and in motion other than uniform motion, when an absolute value of a speed candidate value calculated on the assumption that the measurement target is in the minute displacement state is equal to a value obtained multiplying a distance candidate value calculated on the assumption that the measurement target is in the displacement state by a wavelength change rate of said first semiconductor laser and said second semiconductor laser, and a speed candidate value calculated on the assumption that the measurement target is in the displacement state is not equal to an absolute average hysteresis displacement calculated on the assumption that the measurement target is in the displacement state.

12. A meter according to claim 1, wherein said computing means sets a displacement integration result as a change in distance to the measurement target instead of a calculation result on a distance to the measurement target and a speed of the measurement target, when the measurement target is in a motion state having a minute displacement.

13. A meter according to claim 5, further comprising amplitude adjusting means for adjusting an amplitude of at least one of driving currents supplied from said first laser driver and said second laser driver to said first semiconductor laser and said second semiconductor laser such that a speed candidate value, of a speed candidate value obtained on the assumption that the measurement target is in the minute displacement state and a speed candidate value obtained on the assumption that the measurement target is in the displacement state, which is not selected upon being determined not to be a true value by said state determination unit becomes substantially equal to a value obtained by multiplying a distance candidate value selected upon being determined as a true value by said state determination unit by a wavelength change rate of said first semiconductor laser and said second semiconductor laser.

14. A distance/speed measuring method comprising the steps of:
driving a first semiconductor laser which emits first laser light to a measurement target such that an oscillation interval in which at least an oscillation wavelength continuously monotonically increases repeatedly exists;
driving a second semiconductor laser which emits second laser light to the measurement target parallelly to the first laser light such that an oscillation wavelength increases/decreases inversely to an oscillation wavelength of the first semiconductor laser;
counting the number of interference waveforms generated by the first laser light and return light of the laser light from the measurement target and contained in an output signal from a first light-receiving device, and the number of interference waveforms generated by the second laser light and return light of the laser light from the measurement target and contained in an output signal from a second light-receiving device; and
calculating at least one of a distance to the measurement target and a speed of the measurement target from a minimum oscillation wavelength and a maximum oscillation wavelength of the first semiconductor laser and the second semiconductor laser and the numbers of interference waveforms of the first laser light and the second laser light,
wherein the step of counting comprises the steps of
obtaining the number of interference waveforms contained in an output signal from the light-receiving device corresponding to a semiconductor laser, of the first semiconductor laser and the second semiconductor laser, whose oscillation wavelength has increased, in a first counting interval shorter than the oscillation interval, and
obtaining the number of interference waveforms contained in an output signal from the light-receiving device corresponding to a semiconductor laser, of the first semiconductor laser maximum oscillation wavelength of the first semiconductor laser and the second semiconductor laser and the number of interference waveforms counted,
calculating a hysteresis displacement as a difference between a distance candidate value and a previously calculated distance candidate value,
determining a state of the measurement target on the basis of a candidate value of a distance to the measurement target and a candidate value of a speed of the measurement target, and
confirming at least one of the distance to the measurement target and the speed of the measurement target on the basis of a determination result.

15. A method according to claim 14, further comprising the steps of:
converting the first laser light from the first light-receiving device and the return light of the first laser light into electrical signals, and
converting the second laser light from the second light-receiving device and the return light of the second laser light into electrical signals.

16. A method according to claim 14, further comprising the steps of:
converting the first laser light from the first light-receiving device and the return light of the first laser light into electrical signals, and
converting the second laser light from the second light-receiving device and the return light of the second laser light into electrical signals,
wherein the step of counting comprises the step of counting the number of interference waveforms generated by a self-mixing effect between the first laser light, the second laser light, the return light of the first laser light, and the return light of the second laser light.

17. A method according to claim 14, wherein the step of calculating comprises the steps of
calculating a candidate value of a distance to a measurement target and a candidate value of a speed of the measurement target on the basis of a minimum oscillation wavelength and a obtained on the assumption that the measurement target is in the minute displacement state and a speed candidate value obtained on the assumption that the measurement target is in the displacement state, which is not selected upon being determined not to be a true value in the step of determining becomes substantially equal to a value obtained by multiplying a distance candidate value selected upon being determined as a true value in the step of determining by a wavelength change rate of the first semiconductor laser and the second semiconductor laser.

18. A method according to claim 17, wherein
the step of calculating candidate values and a hysteresis displacement comprises the step of calculating distance candidate values, speed candidate values, and a hysteresis displacement on the assumption that the measurement target is in a minute displacement state and on the assumption that the measurement target is in a displacement state in which the measurement target moves faster than in the minute displacement state, assuming that the measurement target is in one of the minute displacement state and the displacement state, every time the number of interference waveforms is counted, and the step of determining comprises the step of determining whether the measurement target is in the minute displacement state or the displacement state and also determines whether the measurement target is in uniform motion or in motion other than uniform motion, every time candidate values and a hysteresis displacement are calculated.

19. A method according to claim 18, further comprising the step of adjusting an amplitude of at least one of driving currents supplied to the first semiconductor laser and the second semiconductor laser such that a speed candidate value, of a speed candidate value and the second semiconductor laser, whose oscillation wavelength has decreased, in a second counting interval shorter than the oscillation and at least partially different in time from the first counting interval, the two steps of obtaining being alternately performed.

* * * * *